(12) United States Patent
Ozawa et al.

(10) Patent No.: US 6,942,393 B2
(45) Date of Patent: *Sep. 13, 2005

(54) WHEEL BEARING DEVICE

(75) Inventors: Masahiro Ozawa, Shizuoka-Ken (JP); Mitsuru Umekida, Shizuoka-Ken (JP); Noriaki Ida, Shizuoka-Ken (JP)

(73) Assignee: NTN Corporation, Osaka (JP)

(*) Notice: Subject to any disclaimer, the term of this patent is extended or adjusted under 35 U.S.C. 154(b) by 72 days.

This patent is subject to a terminal disclaimer.

(21) Appl. No.: 10/458,729

(22) Filed: Jun. 11, 2003

(65) Prior Publication Data

US 2004/0022469 A1 Feb. 5, 2004

(30) Foreign Application Priority Data

Jun. 18, 2002 (JP) ........................................ 2002-177234
Aug. 30, 2002 (JP) ........................................ 2002-252827

(51) Int. Cl.[7] .............................................. F16C 19/08
(52) U.S. Cl. .................................................... 384/544
(58) Field of Search ................................. 384/544, 589, 384/537; 29/898.061, 898.062, 898.064, 898.07

(56) References Cited

U.S. PATENT DOCUMENTS 6,497,515 B1 * 12/2002 Sahashi et al. ............. 384/544
2003/0210842 A1 * 11/2003 Tajima et al. ............... 384/544
2004/0101224 A1 * 5/2004 Umekida .................... 384/544

* cited by examiner

*Primary Examiner*—Thomas R. Hannon
(74) *Attorney, Agent, or Firm*—Arent Fox PLLC

(57) ABSTRACT

An outer joint member for a constant velocity joint is fitted to the inner periphery of a wheel hub, and the stem portion of the outer joint member that is located inside is plastically deformed in the radially outward direction in order to couple the wheel hub and the outer joint member. The ratio of the inner diameter $\Phi dA$ before plastic deformation in the plastic deformation portion of the outer joint member and the inner diameter $\Phi dB$ after the plastic deformation ($\Delta = \Phi dB / \Phi dA$) is set in the range from 1.05 to 1.15 ($1.05 \leq \Delta \leq 1.15$). In this way, high workability and joining strength can be achieved at a time in the swaging process in the radially outward direction.

17 Claims, 14 Drawing Sheets

WHEEL BEARING DEVICE

BACKGROUND OF THE INVENTION

1. Field of the Invention

The present invention relates to a wheel bearing device for supporting wheels, for example, for an automobile.

2. Description of the Related Art

Wheel bearing devices are generally classified into those for drive-wheel applications and driven-wheel applications. The wheel bearing device for drive wheels, for example, includes a wheel hub and a double-row bearing. Some devices are further attached with a constant velocity joint and formed into a unit.

One of the bearing devices for drive wheels has a construction in which one of the double-row inner races of the bearing is formed on an outer periphery of the wheel hub and the other is formed on an outer periphery of an outer joint member of the constant velocity joint. In the bearing device of this kind, the wheel hub and the constant velocity joint must be coupled together to achieve relative positioning of the double-row inner races and to maintain certain pre-load applied to the inside of the bearing. According to some recently proposed method, a method of coupling them by swaging as shown, e.g., in Japanese Patent Laid-Open Publication No. 2001-18605, which is considered advantageous in terms of effective use of axial space of the bearing and improvement of the rigidity of the coupled portion. With this method, a stem portion of the outer joint member is plastically deformed in a direction in which the diameter is expanded radially outward so that it firmly engages with irregular portions formed in the inner periphery of the wheel hub.

Recently, in the field of wheel bearing devices, there is not only a strong demand for more lightweight compact devices, but also quality and reliability improvement and cost reduction have been in urgent demand.

The present invention is directed to a solution to the demand, and it is a first object of the invention to provide a wheel bearing device that allows high workability and high joining strength to be achieved in such a swaging process at low cost.

It is a second object of the invention to provide a wheel bearing device whose coupling portion is kept from loosening by a large moment load acting upon it and to increase resistance against pull out (pull-out resistance) with a simple structure.

BRIEF SUMMARY OF THE INVENTION

A wheel bearing device according to the invention includes: an outer member formed with double-row outer races on an inner periphery thereof; an inner member including a wheel hub having a flange, for attachment of a wheel and an fitting member fitted to an inner or outer periphery of the wheel hub, the inner member being formed with double-row inner races on an outer periphery thereof, and double-row rolling elements interposed between the outer races and the inner races. Out of the wheel hub and the fitting member, the member that is located outside is provided with a hardened irregular portion, and the other member that is located inside out of the wheel hub and the fitting member is expanded radially outward by plastic deformation to be engaged with the irregular portion, so that the wheel hub and the fitting member are coupled with each other.

In the wheel bearing device, a ratio of an inner diameter $\Phi dA$ before plastic deformation at a plastic deformation portion of the member that is located inside and an inner diameter $\Phi dB$ after the plastic deformation ($\Delta = \Phi dB/\Phi dA$) is equal to 1.05 or more.

When the ratio $\Delta$ is smaller than 1.05, the plastic deformation amount of the plastic deformation portion is reduced, and the plastic deformation portion is not engaged well enough to the member that is located outside.

Therefore, the joining strength between the wheel hub and the fitting member is not sufficient, which makes it difficult to use the wheel bearing device in an automobile.

An upper limit value for the ratio $\Delta$ can be determined based on the material of the member that is located inside.

More specifically, the value can be determined based on the value of the carbon content of the material, and the smaller the carbon content is, the greater can be the upper limit for the ratio $\Delta$.

When for example the member that is located inside is made of S53C, the upper limit value for the ratio $\Delta$ is preferably equal to, or less than, 1.15 ($\Delta \leq 1.15$). When the member is made of S40C which has a smaller carbon content, the ratio $\Delta$ is preferably equal to, or less than, 1.20 ($\Delta \leq 1.20$).

Note that S53C and S40C are both carbon steel for mechanical structure as defined by JIS G4051, and the numbers after "S" each represent the average value of the C content.

For example, S53C contains, as constituent elements, 0.50% to 0.53% C, 0.15% to 0.35% Si, 0.60% to 0.90% Mn, 0.03% or less P, and 0.35% or less S. The constituent elements of S40C are the same as those of the S53C except that the C content is from 0.37% to 0.43%.

The irregular portion hardened by heat treatment is provided at the fitting member, and the plastic deformation portion of the member, which is located inside, that has been plastically deformed is firmly engaged with the irregular portion. In this way, the joining strength between the wheel hub and the fitting member can be increased and the durability of the wheel bearing device can be increased. In this case, when the plastic deformation portion is not subjected to heat treatment, the plastic deformation portion can readily be plastically deformed and surely engaged with the irregular portion.

A wheel bearing device according to the invention includes: an outer member formed with double-row outer races on an inner periphery thereof; an inner member including a wheel hub having a flange for attachment of a wheel and an fitting member fitted to an inner or outer periphery of the wheel hub, the inner member being formed with double-row inner races on an outer periphery thereof; and double-row rolling elements interposed between the outer races and the inner races. Out of the wheel hub and the fitting member, the member that is located outside is provided with a hardened irregular portion, and the other member that is located inside out of the wheel hub and the fitting member is expanded radially outward by plastic deformation to be engaged with the irregular portion, so that the wheel hub and the fitting member are coupled with each other. The irregular portion is partly removed to form an annular recess, and a part of the member that is located inside is extended in the annular recess.

In this way, the annular recess is formed in the irregular portion, and the member that is located inside has its diameter expanded radially outward and is extended into the annular recess, so that the plastic deformation portion at the part is unrestricted by the irregular portion and can have its diameter expanded more outward. Consequently, the pull-out resistance between the wheel hub and the fitting member can be increased with a simple structure.

Preferably, the annular recess is formed at at least one end of the irregular portion excluding the central part of a range for diameter expansion. In this way, the pull-out resistance can be improved at the end portion with relatively low diameter expansion force rather than at the central part with high diameter expansion force, so that reduction in the amount of torque to be transmitted at the coupling portion can be minimized.

Furthermore, a wheel hearing device according to the invention includes: an outer member formed with double-row outer races on an inner periphery thereof; an inner member including a wheel hub having a flange for attachment of a wheel and an fitting member fitted to an inner or outer periphery of the wheel hub, the inner member being formed with double-row inner races on an outer periphery thereof; and double-row rolling elements interposed between the outer races and the inner races. Out of the wheel hub and the fitting member, the member that is located outside is provided with a hardened irregular portion, and the other member that is located inside out of the wheel hub and the fitting member is expanded radially outward by plastic deformation to be engaged with the irregular portion, so that the wheel hub and the fitting member are coupled with each other. An end face of the irregular portion is partly removed to form a prescribed annular recess, and a part of the member that is located inside is extended in the annular recess.

In this way, the annular recess is formed at the end face of the irregular portion, and the member that is located inside has its diameter expanded radially outward and is extended in the annular recess. The shearing force of the extended portion increases the pull-out resistance between the wheel hub and the outer joint member.

When the irregular portion includes a crossing groove pattern having a plurality of independent annular grooves and a plurality of axial grooves substantially intersecting one another, the amount of torque to be transmitted and the pull-out resistance at the coupling portion can effectively be increased.

Preferably, the annular recess may be formed to be 0.5 to 3.0 times as large as a ridge pitch of the annular groove from one end side of the range for diameter expansion. In this way, the shearing strength at the member provided with the irregular portion, the wheel hub, for example, can be well secured, and the amount of torque to be transmitted at the coupling portion can be kept from being reduced, while the pull-out resistance can be increased.

In addition, an axial size of the annular recess may be in the range from 0.5 to 3.0 times as large as a ridge pitch of the annular groove. In this way, the annular recess can readily be formed by working, and the area of the shear plane of the extended portion placed in the annular recess can be well secured. Thus, the pull-out resistance can be increased and the amount of torque to be transmitted at the coupling portion can be kept from being reduced.

In addition, a bottom diameter of the annular recess may be in the range from 1.01 to 1.20 times as large as the bottom diameter of the annular groove or the axial groove. In this way, the member provided with the irregular portion, the wheel hub, for example, can have sufficient strength, and the pull-out resistance can be increased.

In addition, an outer diameter after expanding the diameter of the plastic deformation portion may be in the range from 1.01 to 1.15 times as large as the bottom diameter of the annular groove or the axial groove. In this way, the amount of torque to be transmitted and strength including pull-out resistance, at the coupling portion, the ductility of the material of the diameter expanded portion, the workability, the useful life of jigs can be taken into account to determine the optimum diameter expansion amount.

More specifically, in the above described wheel bearing device, the fitting member, for example, may be an outer joint member of a constant velocity joint. In this case, one of the wheel hub and the outer joint member is the member that is located inside and plastically deformed in the radially outward direction. The other member is the member that is located outside. In either case, the double-row inner race can be provided at the outer periphery of each of the wheel hub and the outer joint member (see FIG. 1).

Alternatively, the fitting member may be an inner ring fitted to the wheel hub.

In this case, the double-row inner race may be formed at the outer periphery of each of the wheel hub and the inner ring (see FIG. 5) or may be formed at the outer periphery of each of the two inner rings fitted to the outer periphery of the wheel hub (see FIG. 6).

The load carrying capacity of a bearing including a rolling element on an inboard side out of the double-row rolling elements may be higher than that on an outboard side. In this way, the useful life of the two bearings can be balanced, so that the durability of the device can substantially be improved.

BRIEF DESCRIPTION OF THE DRAWINGS

FIG. 10$b$ is a cross-sectional view showing the shape of an irregular portion for a wheel hub according to the invention.

FIG. 11$a$ is a cross-sectional view of an essential part of a wheel bearing device according to another embodiment of the invention.

FIG. 11b is a side view of FIG. 11a.

FIG. 14b is a side view of FIG. 14a.

FIG. 15b is a side view of FIG. 15a.

DETAILED DESCRIPTION OF THE INVENTION

Now, embodiments of the present invention will be described with reference to FIGS. 1 to 16.

Figure 1:
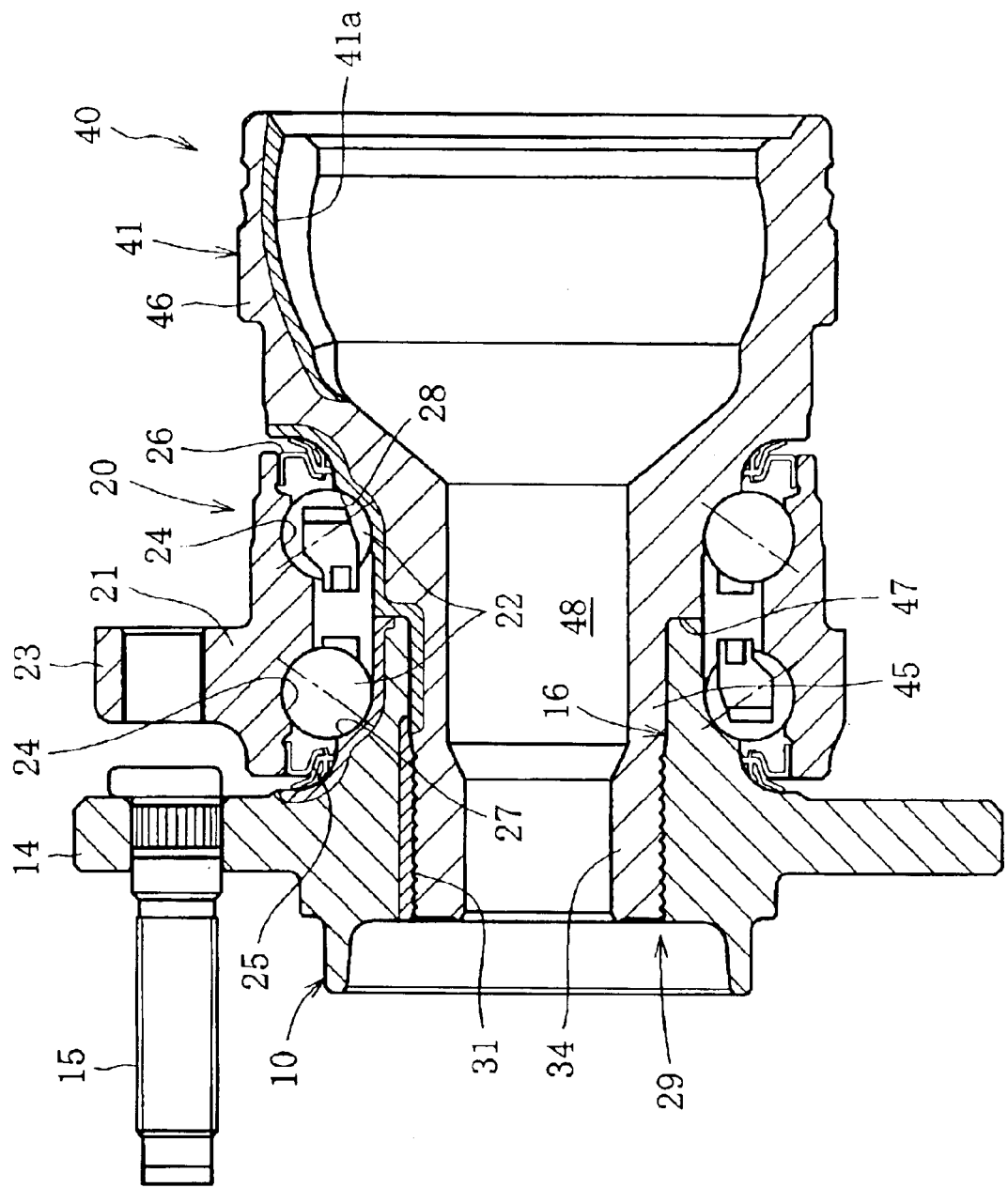
FIG. 1 is a cross-sectional view of a wheel bearing device according to one embodiment of the invention.

FIG. 1 shows a wheel bearing device for drive wheels to which the invention is applied. The wheel bearing device includes a wheel hub 10, a bearing 20, and a constant velocity joint 40, and these elements are formed as a unit. Note that the side of the bearing device located on the outer side of the vehicle as it is mounted on the vehicle is referred to as "outboard side" (the left in each of the drawings), while the side of the bearing device near the center of the vehicle is referred to as "inboard side" (the right in each of the drawings).

The wheel hub 10 having an axial bore in the axial center is hollow inside. A wheel attachment flange 14 for attaching a wheel (not shown) is formed at the outboard side end of the wheel hub 10, and hub bolts 15 for fixing the wheel disc are inserted at equal intervals in a circumferential direction of the flange 14. An inner race 27 on the outboard side is formed on the outer peripheral surface of the wheel hub 10 more on the inboard side relative to the flange 14.

The constant velocity joint 40 transmits torque from a drive shaft to an outer joint member 41 through an inner joint member and torque transmission balls (both not shown). The outer joint member 41 has a plurality of track grooves 41a in the inner periphery thereof. These track grooves 41a and a plurality of track grooves provided in the outer periphery of the inner joint member are in cooperation to form a plurality of ball tracks. Torque transmission balls are provided in the respective ball tracks. Track transmission balls are held in the same plane by a cage that is not shown.

The outer joint member 41 is a fitting member to be fitted to the inner periphery of the wheel hub 10. The outer joint member 41 includes a stem portion 45 and a mouth portion 46 integrally formed with each other and has its stem portion 45 fitted to the inner periphery of the wheel hub 10. The shoulder 47 of the mouth portion 46 abuts against the inboard side end face of the wheel hub 10, so that the wheel hub 10 and the outer joint member 41 are axially positioned, and the distance between inner races 27 and 28 is defined. The inboard side inner race 28 is formed at the outer peripheral surface of the mouth portion 46 near the shoulder 47. The stem portion 45 is made hollow inside as an axial bore 48 in communication with the bottom of the cup-shaped mouth portion 46 is provided.

The outer joint member 41 is molded by forging and then partly heat-treated. As denoted by the hatching in FIG. 1, the part hardened by the heat-treatment includes a region from the shoulder 47 through the inboard side inner race 28 to the slidable contact surface (seal land) with a seal lip of a seal 26, and a region of the track grooves 41a in the inner periphery of the mouth portion 46 where the torque transmission balls roll. These regions are both hardened until they are as hard as 58 HRc or more. Induction hardening is preferably employed as the kind of heat-treatment. According to the method, local heating can be carried out, the depth of the hardened layer can be selected as desired, the part other than the hardened layer is little affected by the heat, and the performance of the base material can be maintained.

The other part, especially the part of the stem portion 45 to be plastically deformed radially outward (plastic deformation portion 34) in the swaging that will be described later is not heat-treated after the forging. In the non-heat treated portion, the hardness of the plastic deformation portion 34 is preferably as low as possible in consideration of the workability in the swaging process. However, if the hardness is too low, the fatigue resistance is lowered. Consequently, the plastic deformation portion 34 preferably has hardness in the range from 13 HRc to 28 HRc, more preferably in the range from 18 HRc to 25 HRc.

The bearing 20 includes an outer member 21 and double-row rolling elements 22. The outer member 21 includes a flange 23 for attachment to the vehicle body (not shown), and double-row outer races 24 provided on the inner peripheral surface where the rolling elements 22 roll. The double-row rolling elements 22 are incorporated between the inner race 27 of the wheel hub 10 and the inner race 28 of the outer joint member 41, and the double-row outer races 24 of the outer member 21. The double-row angular ball bearing having balls as the rolling elements 22 is shown here, but a double-row, tapered roller bearing having tapered rollers as the rolling elements are employed in some heavy automobile wheel bearing devices. Seals 25 and 26 are attached at openings at both ends of the outer member 21 in order to keep grease filling inside the bearing from leaking or water and foreign matters from coming inside.

Part of the fitting surface 16 at the inner periphery of the wheel hub 10 opposing the plastic deformation portion 34 of the outer joint member 41 is provided with an irregular portion 31. The part of the fitting surface 16 other than for the irregular portion 31 is formed to have a cylindrical shape to fit with the cylindrical outer peripheral surface of the stem portion 45 in a tightly contacted state. The shape of the irregular portions 31 is arbitrary and may be, for example, various forms such as threads, serration including splines, and crisscross-patterned knurls in which a plurality of rows of grooves cross with each other. The irregular portion 31 thus formed is heat-treated and hardened to have hardness in the range from 54 HRc to 64 HRc.

As denoted by the hatching part in FIG. 1, the layer hardened by the heat-treatment exists not only in the region of irregular portion 31 in the inner periphery of the wheel hub 10 but also in the region in the outer periphery of the wheel hub 10 from the seal land of the seal 25 via the inner race 27 to the end face of the inboard side end. The regions are preferably heat-treated by induction hardening for the same reason as described above. Note that these hardened layers are not continuous as shown, so that the wheel hub 10 is kept from having quenching cracks.

The wheel hub 10 as the member that is located inside and the outer joint member 41 as the fitting member are integrally plastically coupled by swaging in the radially outward direction. More specifically, as the stem portion 45 of the outer joint member 41 is fitted to the inner periphery of the wheel hub 10, the plastic deformation portion 34 of the stem portion 45 is plastically deformed from the inner diameter side to the outer diameter side. The outer periphery of the plastic deformation portion 34 is firmly engaged with the irregular portion 31, so that the wheel hub 10 and the outer joint member 41 are plastically coupled. In this way, the distance between the inner races 27 and 28 is defined and prescribed pre-load is provided inside the bearing 20. The wheel hub 10 and the outer joint member 41 as they are plastically coupled form an inner member 29 having the double-rows inner races 27 and 28 at its outer periphery.

As for swaging, the irregular portion 31 has high hardness as described above and is not easily broken, while the plastic deformation portion 34 on the diameter expanded side is less hard and more ductile than the irregular portion 31. Therefore, it can be formed with a larger margin for the swaging without raising the risk of swaging cracks in the stem part 45. Consequently, the irregular portion 31 can deeply be engaged with the plastic deformation portion 34, so that high joining strength can be secured between the wheel hub 10 and the outer joint member 41.

Figure 2:
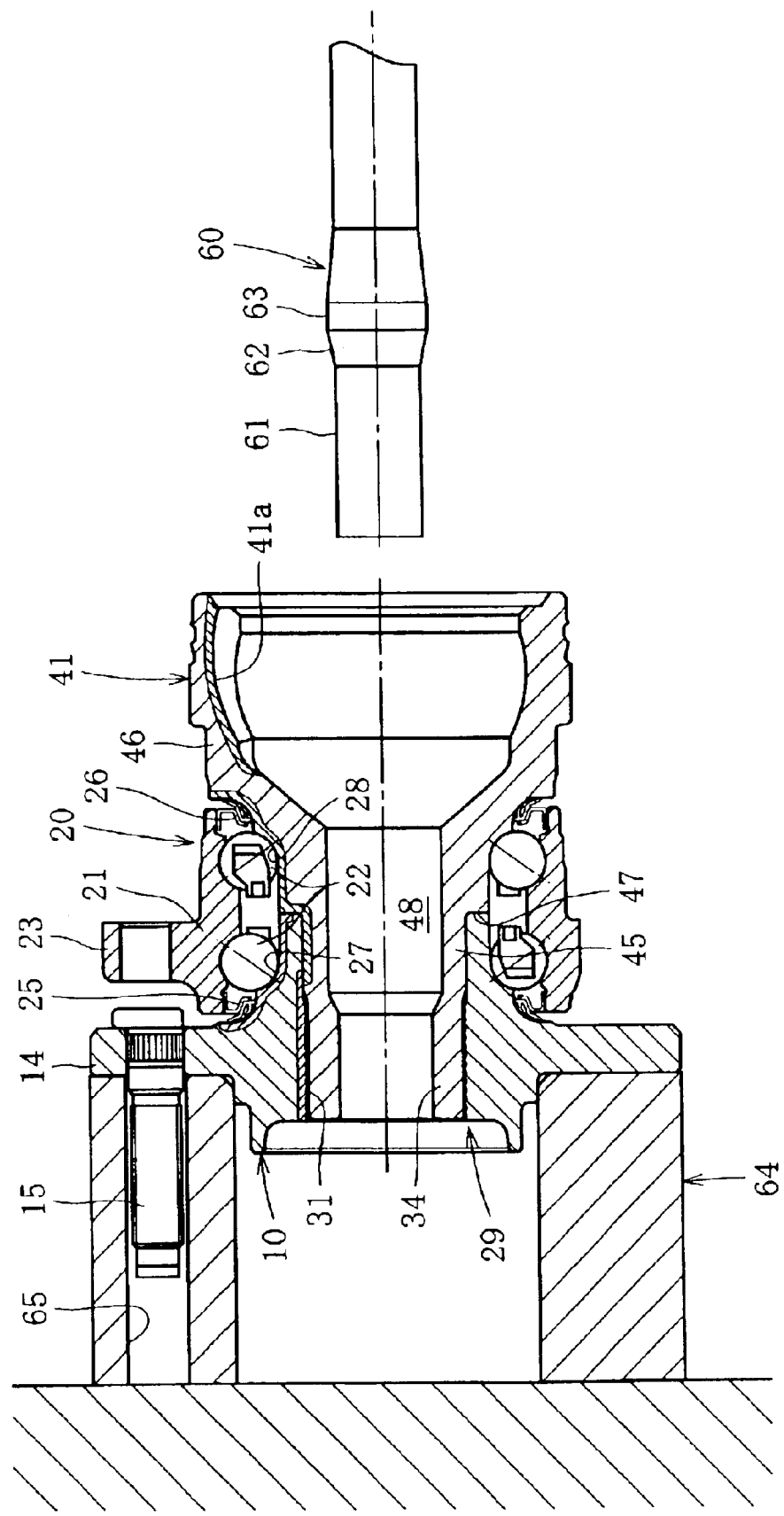
FIG. 2 is a cross-sectional view for use in illustration of the process of swaging in the radially outward direction wheel bearing device.

As shown in FIG. 2, for example, the swaging can be carried out by inserting a swaging jig (punch) 60 into the bore 48 at the inner periphery of the stem portion 45 of the outerjoint member 41. The swaging jig 60 includes, from the tip end side (the side to be inserted to the stem portion 45), a small diameter cylindrical portion 61, a taper portion 62, and a large diameter cylindrical portion 63. The outer diameter of the small diameter cylindrical portion 61 is smaller than the inner diameter $\Phi dA$ of the plastic deformation portion 34 (see FIG. 3) before swaging. The outer diameter of the large diameter cylindrical portion 63 is larger than the inner diameter $\Phi dA$.

As for the swaging, as shown in FIG. 2, with the outer joint member 41 being inserted to the inner periphery of the wheel hub 10, the wheel bearing device is set on a pad 64. At the time, the outboard side end face of the wheel attachment flange 14 bears on the end face of the pad 64. The hub bolt 15 is stored in a bolt hole 65 provided in the pad 64.

In this state, the swaging jig 60 is pressed into the bore 48 of the outer joint member 41 from the inboard side. In this way, the plastic deformation portion 34 of the stem portion 45 is expanded under pressure by the tapered surface 62 of the swaging jig 60 and then the large diameter cylindrical portion 63 thereof, and plastically deformed in the radially outward direction, so that the outer peripheral surface is firmly engaged with the irregular portion 31 at the inner periphery of the wheel hub 10.

At the time, as the swaging jig 60 is pressed in, the outer joint member 41 receives the pressing force acting toward the outboard side. Meanwhile, the wheel hub 10 bearing on the pad 64 resists the pressing force, so that the axial abutting part between the wheel hub 10 and the outer joint member 41 (between the shoulder 47 of the outer joint member 41 and the inboard side end face of the wheel hub 10) is subject to compressive strain. This makes the axial bearing gap negative and the bearing 20 can be pre-loaded, so that the pre-load can be set as the swaging coupling is complete. The same effect is provided by inserting the swaging jig 60 in the direction to cause the compressive strain at the abutting part (axial abutting part) between the two members to be coupled by the swaging.

Meanwhile, in the process of swaging of the plastic deformation portion 34, there would be a lower limit for the amount of how much the diameter is to be expanded radially outward. If the amount is not more than a fixed amount, the plastic deformation portion 34 is not engaged enough with the irregular portion 31, and joining strength necessary for the wheel bearing device cannot be provided.

Figure 3:
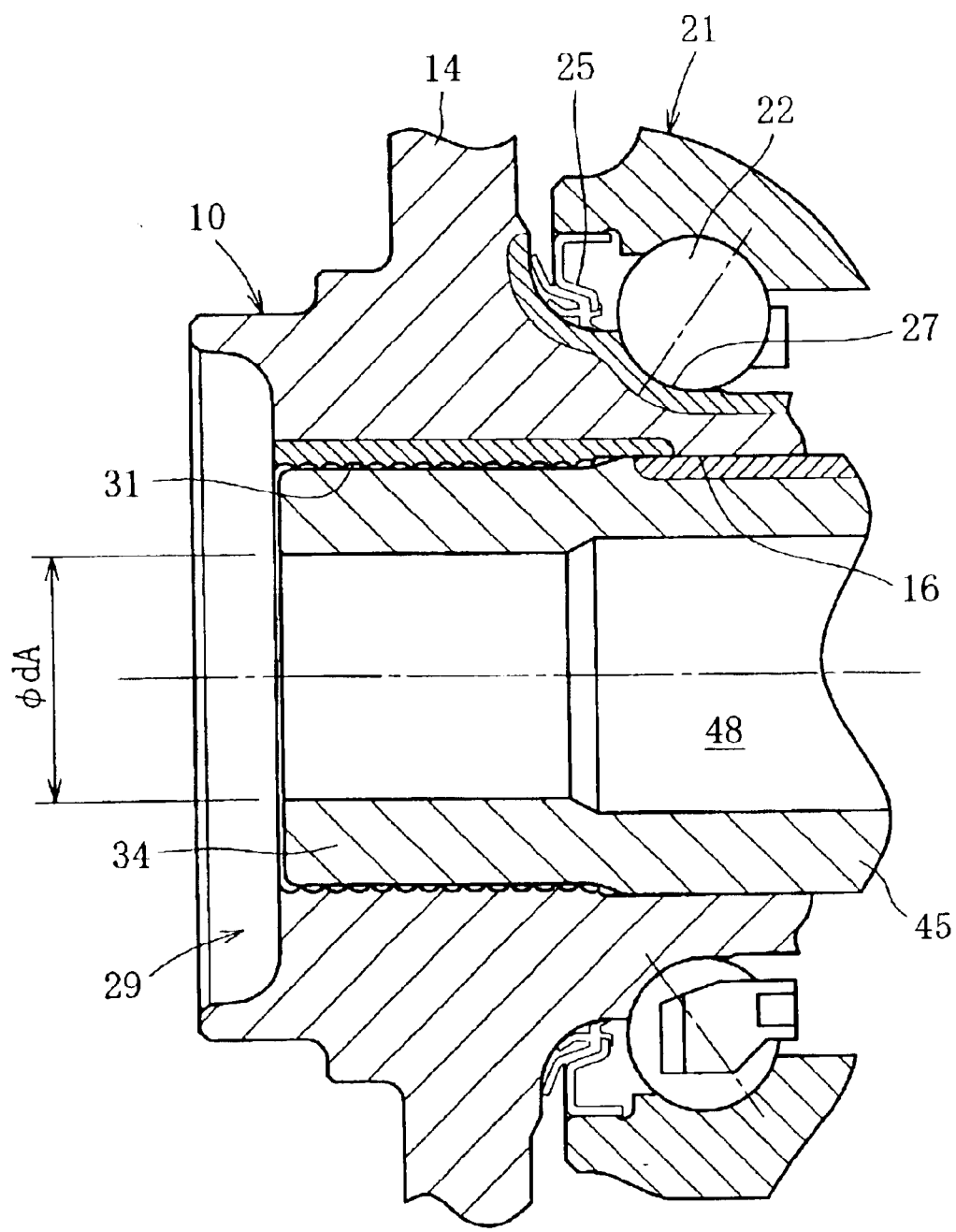
FIG. 3 is a cross-sectional view showing the state of the wheel bearing device before swaging in the radially outward direction.
Figure 4:
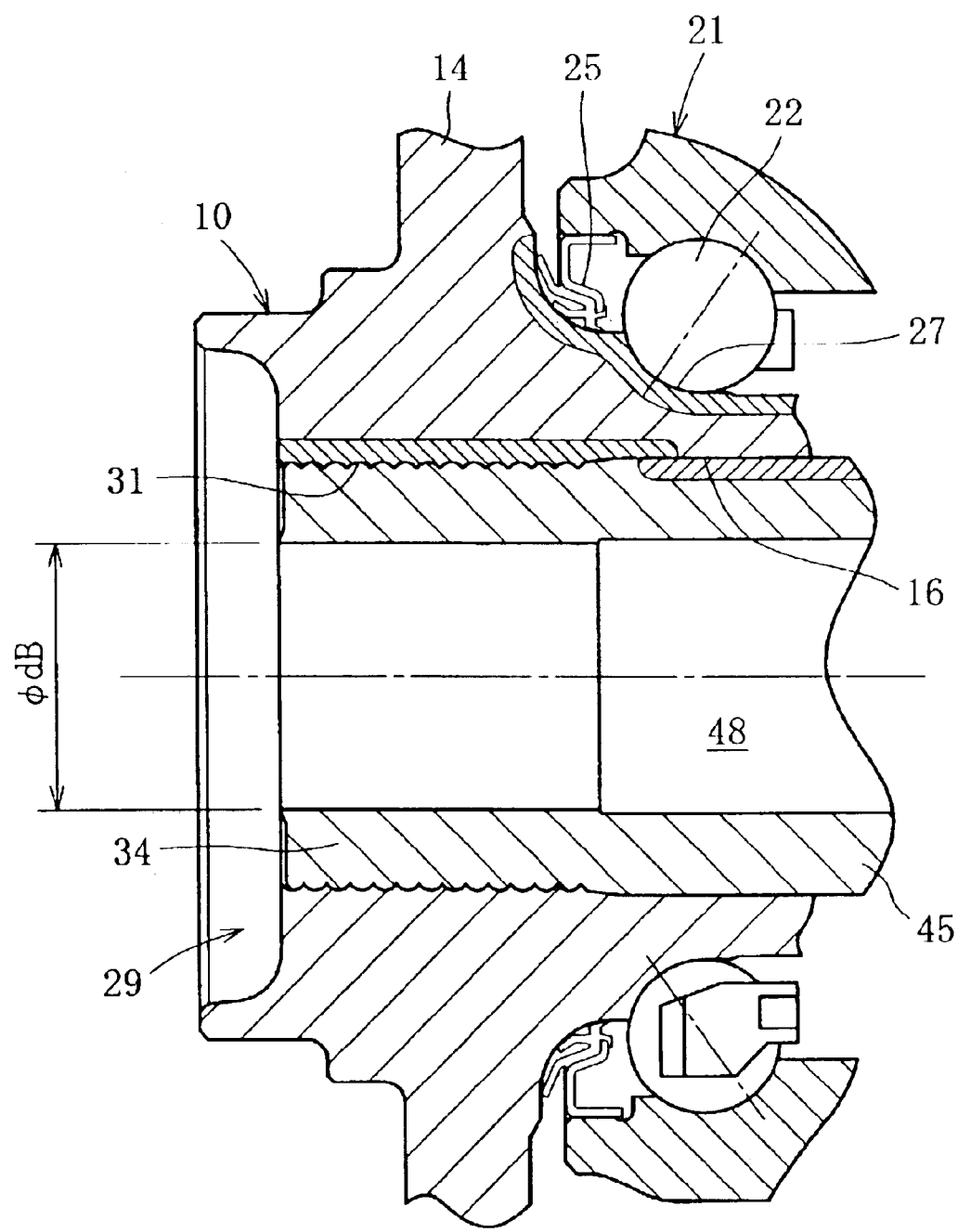
FIG. 4 is a cross-sectional view showing the state of the wheel bearing device after swaging in the radially outward direction.
Figure 8:
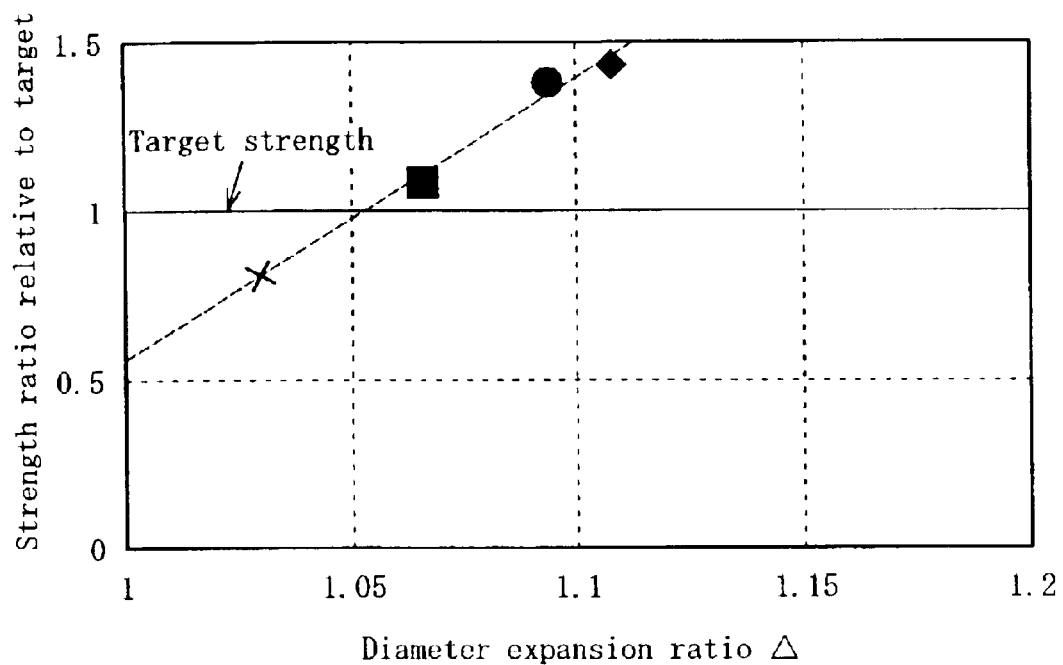
FIG. 8 is a graph showing comparison examination results between the product according to the invention and a comparative example.

Based on the above assumption, the inventors carried out examinations. FIG. 3 shows the inner diameter $\Phi dA$ of the plastic deformation portion 34 before plastic deformation. FIG. 4 shows the inner diameter $\Phi dB$ of the plastic deformation portion 34 after the plastic deformation. It has been found that the ratio $\Delta$ of these diameters $\Phi dA$ and $\Phi dB$ ($\Delta = \Phi dB / \Phi dA$), in other words, the diameter expansion ratio is not less than 1.05, sufficient joining strength (target strength) is obtained between the wheel hub 10 and the outer joint member 41 as shown in FIG. 8. In FIG. 8, x represents a comparative example, and the other signs represent those according to the invention.

The lower limit value for $\Delta$ would hardly be affected by the material of the plastic deformation portion 34 and common among various steel materials.

When the value of ratio $\Delta$ is too large, the material is excessively ductile, which could give rise to failure such as swaging cracks. The upper limit value for the ratio $\Delta$ differs based on the content of carbon in the material for the plastic deformation portion 34, and the upper limit value for the ratio $\Delta$ is greater as the content is smaller.

The inventors have found out through examinations that when the material of the outer joint member 41, for example, is S40C (whose carbon content is from 0.37% to 0.43%), and the ratio $\Delta$ is more than 1.20, swaging cracks form. In this case, the ratio $\Delta$ must be at most 1.20 ($\Delta \leq 1.20$).

It has also been found that when the material of the outer joint member 41, for example, is S53C (whose carbon content is from 0.50% to 0.56%), and the ratio $\Delta$ is more than 1.15, swaging cracks form. In this case, the ratio $\Delta$ must be at most 1.15 ($\Delta \leq 1.15$).

For the outer joint member 41, not only S40C or S53C described above, but also other kinds of carbon steel for mechanical structure (specified by JIS) whose carbon content is from 0.30% to 0.61% can widely be used. With any carbon steel for machine structure adapted to the range, the rolling strength of the race surface can be increased by induction hardening to a level comparable to that of a dip hardened, high carbon chromium bearing steel or carburized, case hardened steel. The product can be produced at low cost and have a long useful life. Meanwhile, the hardness of the plastic deformation portion 34 can be lowered and high swaging workability can be secured even without heat treatment. This can further reduce the cost.

In addition, a steel material containing 0.5 wt % to 0.7 wt % C, 0.6 wt % to 1.2 wt % Si, 0.6 wt % to 1.0 wt % Mn and Fe and an inevitable impurity for the remainder may be used. The inventors have found through experiments that the ratio $\Delta$ for the steel material is preferably specified as follows:

$$1.05 \leq \Delta \leq 1.14$$

Figure 7:
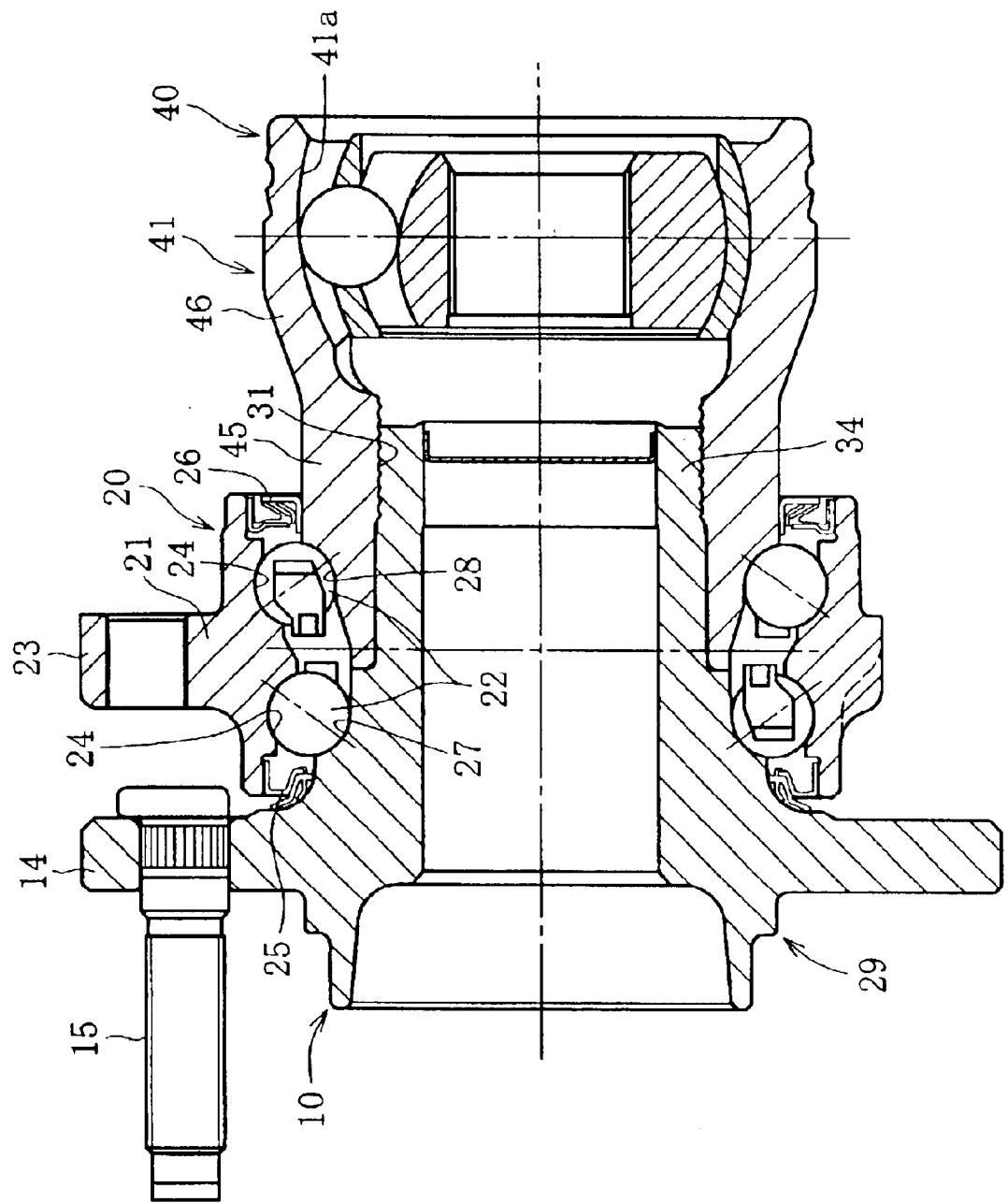
FIG. 7 is a cross-sectional view showing a wheel bearing device according to further another embodiment of the invention.

Note that in FIG. 1, the wheel hub 10 is located outside at the swaging portion, but conversely the outer joint member 41 may be located outside (see FIG. 7). In the case, the wheel-hub 10 is the member that located inside where the plastic deformation portion 34 is formed. The outer joint member 41 serves as a fitting member to be fitted to the outer periphery of the wheel hub 10. In the case, the ratio $\Delta$ of the inner diameters of the plastic deformation portion 34 before and after the plastic deformation is set in the same range as described above.

Now, another type of wheel bearing device according to an embodiment of the invention will be described with reference to FIGS. 5 and 6. Note that in these drawings, elements functioning in the same manner as those shown in FIG. 1 are denoted by the same reference numerals and will not be described.

Figure 5:
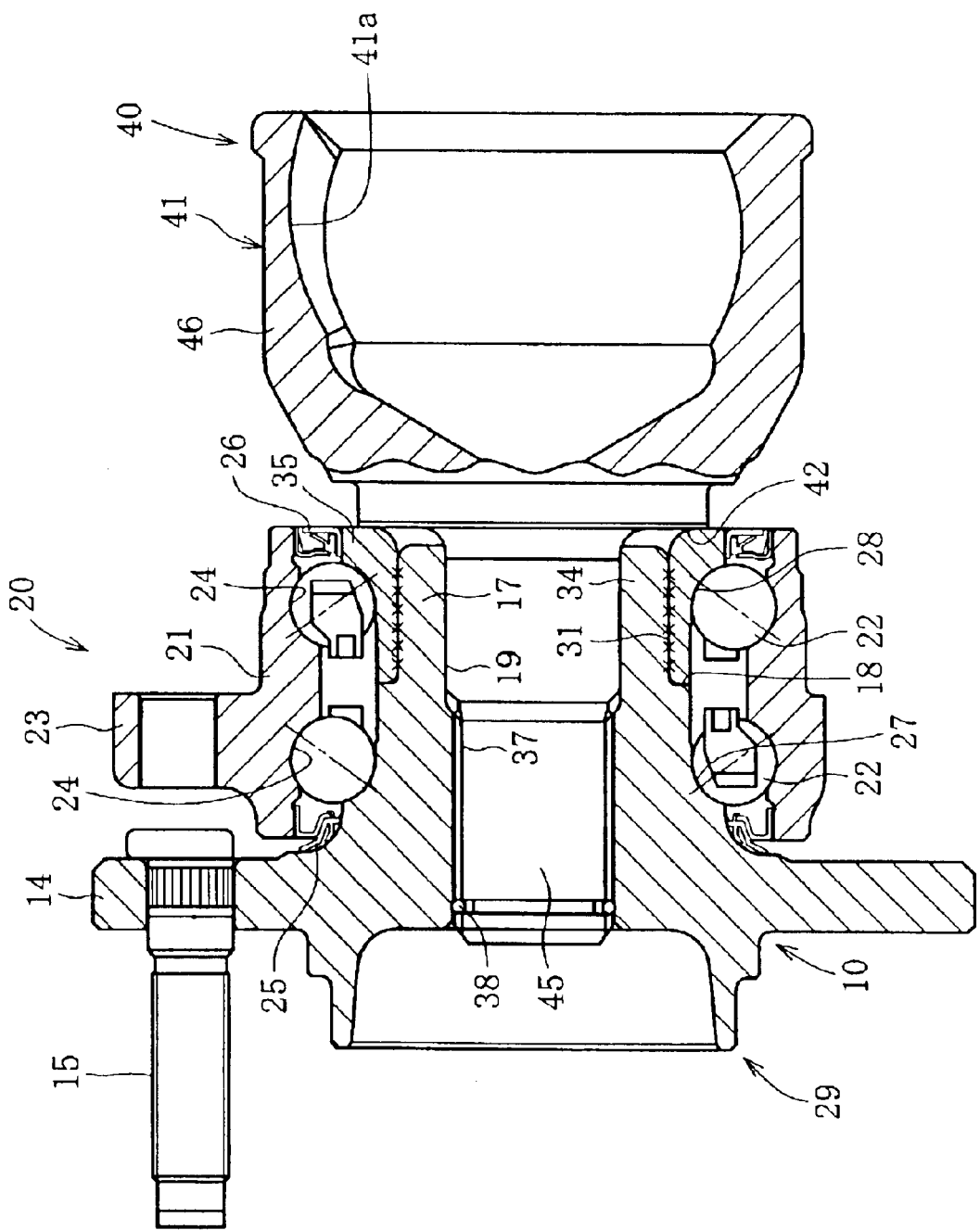
FIG. 5 is a cross-sectional view showing a wheel bearing device according to another embodiment of the invention.

FIG. 5 shows the embodiment according to which a wheel hub 10, and an inner ring 35 fitted to the outer periphery of the wheel hub 10 form an inner member 29. The outboard side inner race 27 of the inner member 29 is formed on the outer periphery of the wheel hub 10. The inboard side inner race 28 is formed on the outer periphery of the inner ring 35.

According to the embodiment, the inner ring 35 is press fitted to the outer periphery of a small diameter cylindrical portion 19 formed on the inboard side end of the wheel hub 10. The outer joint member 41 is fitted to the inner periphery of the wheel hub 10, and coupled with the wheel hub 10 through torque transmission means 37 such as a spline. Meanwhile, the member is prevented from coming off from the wheel hub 10 by a retaining ring 38. The inboard side end face of the inner ring 35 is abutted against the shoulder 42 of the outer joint member 41, while the outboard side end face is abutted against the shoulder 18 of the wheel hub 10.

According to the embodiment, the plastic deformation portion 34 is formed in the small-diameter cylindrical portion 19 of the wheel hub 10, and the hardened irregular portion 31 is formed in the inner periphery of the inner ring 35. The region of the irregular portion 31 is denoted by "x" mark. The plastic deformation portion 34 of the wheel hub 10 is not heat-treated, and plastically deformed in the radially outward direction. In this way, the outer periphery of the small-diameter cylindrical portion 19 is firmly engaged with the irregular portion 31 of the inner ring 35, so that the wheel hub 10 and the inner ring 35 are plastically coupled with each other. In this case, the wheel hub 10 serves as the member that is located inside, and the inner ring 35 serves as the fitting member fitted to the outer periphery of the wheel hub 10.

According to the embodiment, the ratio Δ of the inner diameters of the plastic deformation portion 34 of the wheel hub 10 before and after the plastic deformation is set in the range described above.

Figure 6:
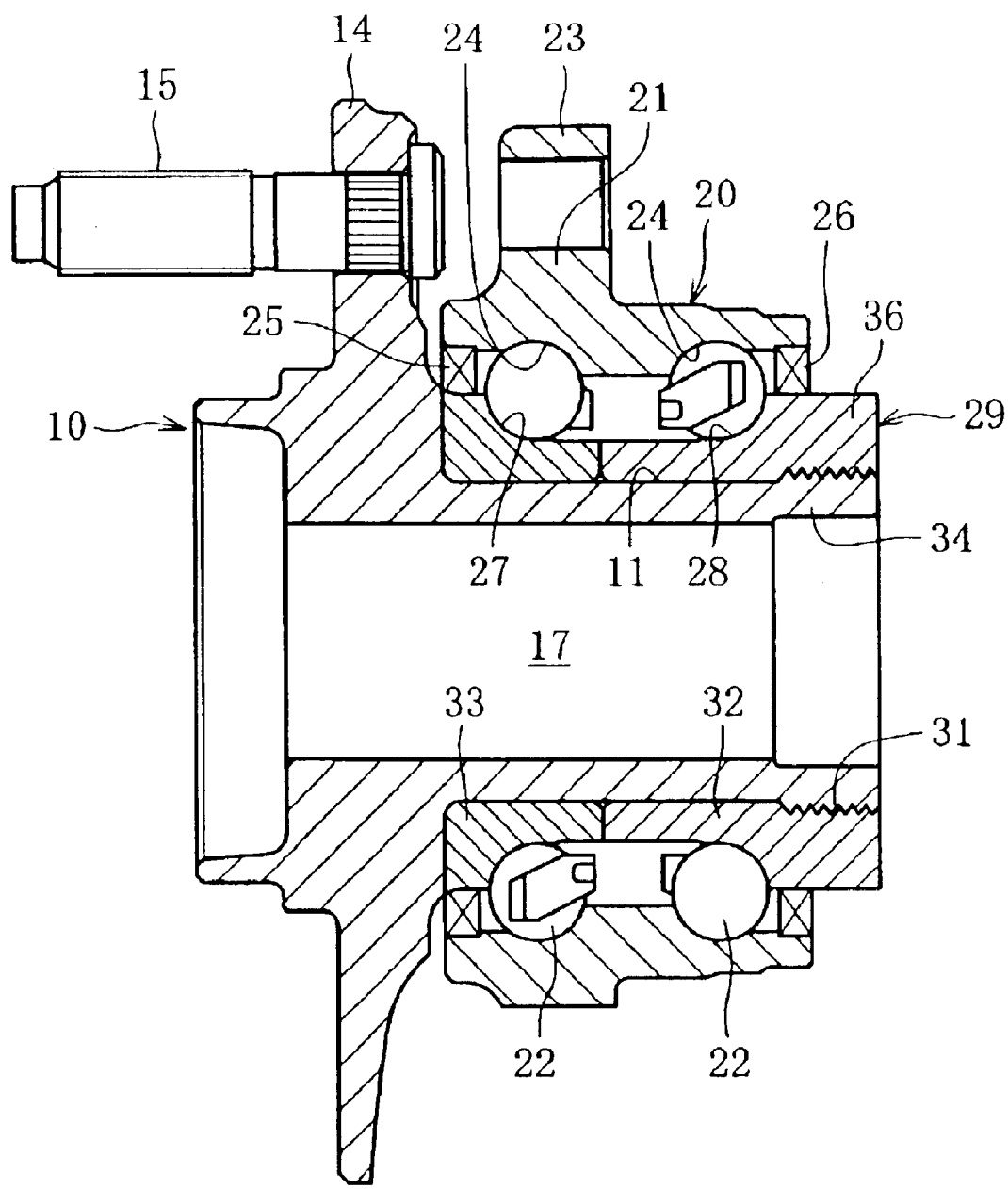
FIG. 6 is a cross-sectional view showing a wheel bearing device according to still another embodiment of the invention.

FIG. 6 shows an embodiment according to which a wheel hub 10 and first and second inner rings 32 and 33 which are fitted to the outer periphery of the wheel hub 10 form an inner member 29. The inner races 27 and 28 of the inner member 29 are formed in the outer peripheries of the inner rings 33 and 32, respectively. The outer joint member that is not shown is fitted to the inner periphery of the wheel hub 10, so that torque can be transmitted between the member and the wheel hub 10.

An axial extension portion 36 is formed at the inboard side end of the first inner ring 32, and an irregular portion 31 hardened by heat treatment is formed in the inner periphery of the extension portion 36. The plastic deformation portion 34 at the inboard side end of the wheel hub 10 is not heat-treated, and this portion is plastically deformed in the radially outward direction and firmly engaged with the irregular portion 31. In this way, the wheel hub 10 and the inner ring 32 are plastically coupled. In this case, the wheel hub 10 serves as the member that is located inside, and the inner rings 32 and 33 serve as the fitting member fitted to the outer periphery of the wheel hub 10.

Also according to this embodiment, the ratio Δ of the inner diameters before and after plastic deformation in the plastic deformation portion 34 of the wheel hub 10 is set in the above range.

Note that FIGS. 5 and 6 show a wheel bearing device for drive wheels that includes the wheel hub 10, the bearing 20, and the outer joint member formed as a unit by way of illustration. Meanwhile, the wheel bearing device of the invention can obviously be applied to a driven wheel, which does not include any outer joint member, but includes only a wheel hub and a bearing.

As in the foregoing, according to the invention, how much the plastic deformation portion is deformed is controlled to a suitable amount, and therefore sufficient joining strength is secured between the member that is located inside and the fitting member. Meanwhile, the plastic deformation portion can be prevented from being damaged, for example, by swaging cracks caused by excessive plastic deformation, which improves the workability. In this way, the strength of the wheel bearing device can be improved and the quality of the device can be stabilized.

Figure 9:
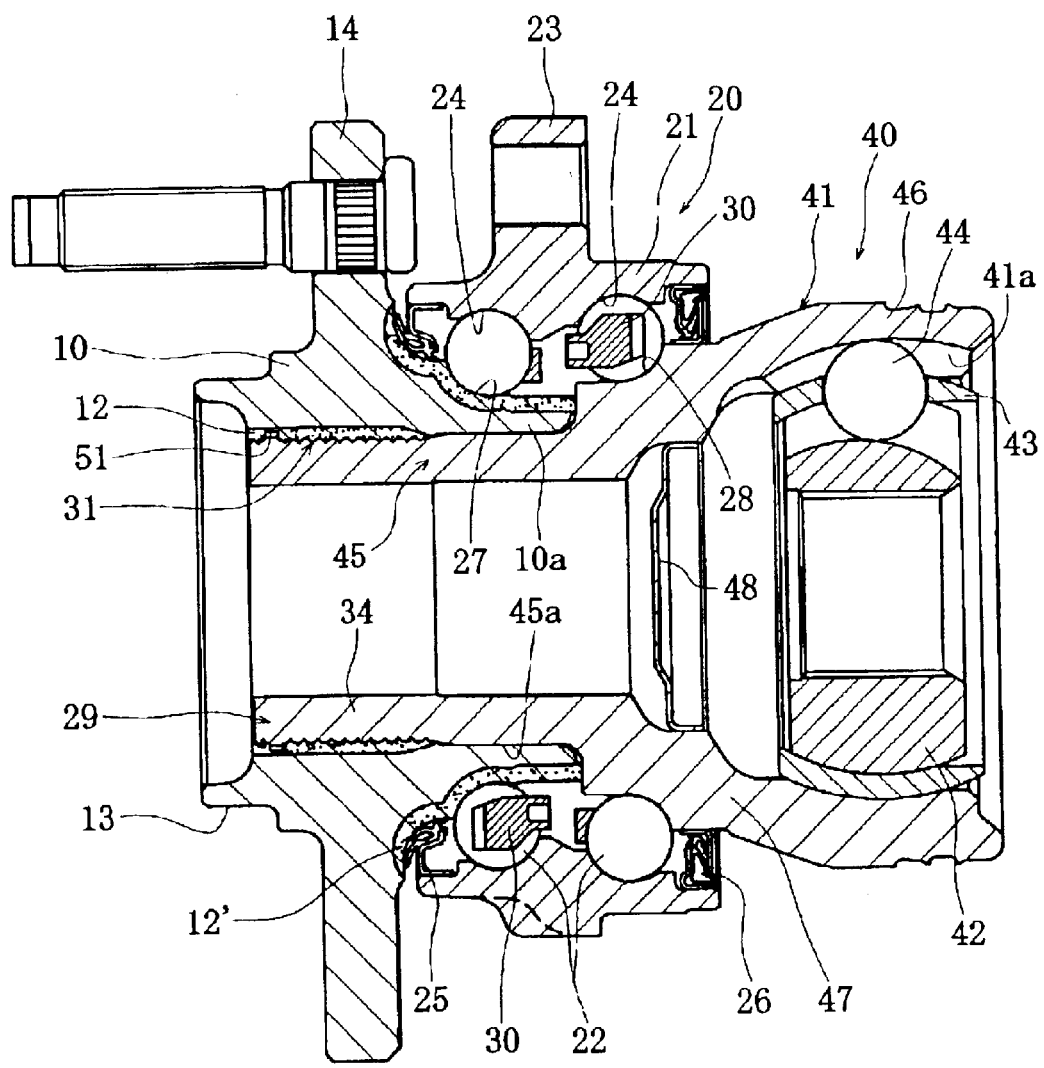
FIG. 9 is a cross-sectional view showing a wheel bearing device according to another embodiment of the invention.

FIG. 9 is a longitudinal sectional view of a wheel bearing device according to an embodiment of the invention. The wheel bearing device includes a wheel hub 10, a double-row rolling bearing 20, and a constant velocity joint 40 formed as a unit.

The wheel hub 10 has an integrally formed flange 14 for attaching a wheel (not shown) on the outboard side end. An irregular portion 31 is formed in the inner periphery of the wheel hub 10. A hardened layer 12 is formed by heat treatment to have surface hardness from 54 HRc to 64 HRc (denoted by the dotted part in the drawing). The heat treatment by induction hardening is preferably applied, because the method allows local heating and the depth of the hardened layer to be relatively easily set.

Figure 10A:
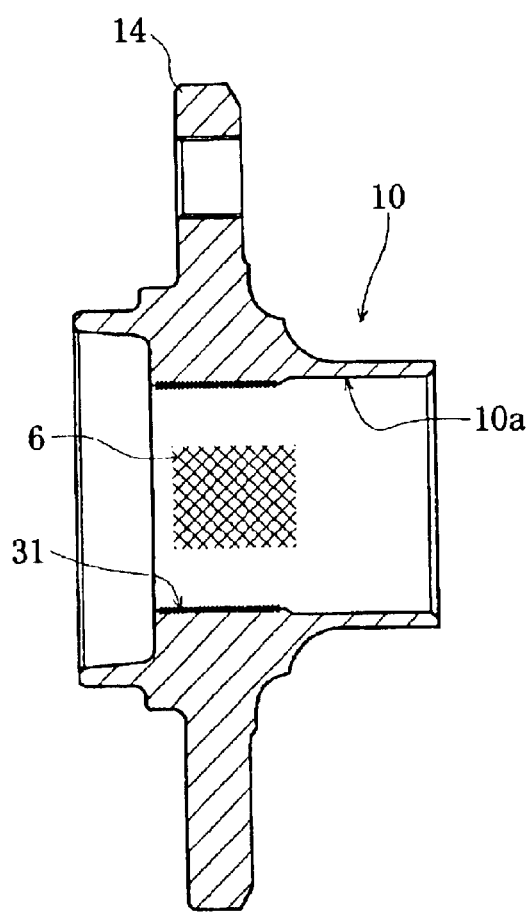
FIG. 10$a$ is a cross-sectional view showing the shape of an irregular portion for a wheel hub according to the invention.
Figure 10B:
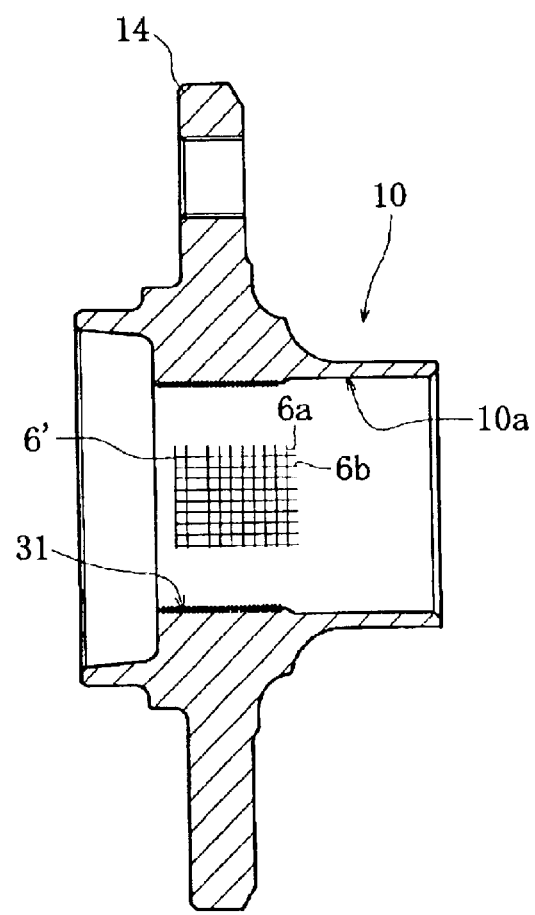

Note that the irregular portion 31, for example, may have a pattern having sets of grooves crossing each other as shown in FIGS. 10a and 10b. FIG. 10a shows grooves 6 slanted to each other, and FIG. 10b shows crisscross-patterned knurls having grooves 6' in the axial and circumferential directions. The raised part of the irregular portion 31 has a pointed end such as of a triangle shape in order to secure that the part bites well. Here, a plurality of annular grooves 6a formed independently, for example, using a lathe and a plurality of axial grooves 6b formed, for example, by broaching are arranged substantially intersecting each other to form a crossing groove pattern 6'.

The double-row rolling bearing 20 includes an outer member 21, an inner member 29, and a plurality of rolling elements 22, 22. The outer member 21 has an integrally formed flange 23 on the outer periphery for attachment to a vehicle body (not shown) and double-row outer races 24, 24 are formed in the inner periphery. The inner member 29 refers to the wheel hub 10 and an outer joint member 41 that will be described later. The outboard side inner race 27 opposing the outer race 24 of the outer member 21 is formed in the outer periphery of the wheel hub 10, and the inboard side inner race 28 is formed in the outer periphery of the outer joint member 41. The double-row rolling elements 22, 22 are stored between the races 24 and 27 and between the races 24 and 28, and held by cages 30, 30 so that the rolling elements can be rolled as required. Seals 25 and 26 are mounted at the end of the double-row rolling bearing 20, so that lubricant grease enclosed inside the bearing can be prevented from leaking out and rain or dust can be prevented from coming inside. At the outer periphery of the wheel hub 10, the seal lip of the seal 25 slidably comes into contact with a seal land portion. A hardened layer 12' is formed by induction hardening at the seal land portion, the inner race portion 27, and the surface of nesting portion 10a in abutment against the shoulder 47 of the outer joint member 41

(denoted by the dotted part). In the above description, the double-row rolling bearing 20 is a double-row angular contact ball bearing having balls 22 as the rolling elements by way of illustration. However, a double-row tapered roller bearing having tapered rollers as the rolling elements may be used other than the above example.

In this type of bearing device for drive wheels, the inboard side of the double row rolling bearing 20 is provided with relatively greater moment load. In order to keep the rolling fatigue and life of the right and left parts in balance, the double-row rolling elements 22 have different PCDs (pitch circle diameters) between the outboard side and the inboard side. The PCD on inboard side is set slightly larger than that on the outboard side, because the inboard side carries relatively greater moment load. In this way, the load carrying capacity is increased. Alternatively, the number or size of the rolling elements 22 on the inboard side may be changed, so that the load carrying capacity of the inboard side bearing may be increased.

A constant velocity joint 40 includes an outer joint member 41, a joint inner ring 42, a cage 43, and atorque transmission ball 44. The outer joint member 41 includes a cup shaped mouth portion 46, a shoulder portion 47 forming the bottom of the mouth portion 46, and an axial portion 45 (stem portion) extending axially from the shoulder portion 47. A curved track groove 41a is formed extending axially in the inner periphery of the mouth portion 46.

The above, described inner race 28 is formed in the outer periphery of the shoulder portion 47 of the outer joint member 41 that is made hollow inside. The axial portion 20 has a small-diameter stepped portion 45a to which the nesting portion 10a of the wheel hub 10 is pressed in, and a plastic deformation portion 34 to be fitted to the wheel hub 10. The nesting portion 10a of the wheel hub 10 is pressed into the small-diameter stepped portion 45a. Then, the nesting portion 10a is in abutment against the shoulder portion 47, and the plastic deformation portion 34 is fitted into the wheel hub 10, while the plastic deformation portion 34 is firmly engaged with the irregular portion 31 of the wheel hub 10 as the deformation portion 34 has its diameter expanded radially outward by appropriate means such as a mandrel inserted/pulled into/from the inner diameter of the plastic deformation portion 34. In this way, the plastic deformation portion 34 is swaged, so that the wheel hub 10 and the outer joint member 41 are plastically coupled. In this manner, the coupling portion serves as the torque transmission means and the coupling means for the wheel hub 10 and the outer joint member 41. Therefore, the conventional torque transmission means such as serration is not necessary at the wheel hub 10 or the outer joint member 41. In other words, the device can be lightweight and compact.

In the outer joint member 41, surface hardening process is carried out to a region of the track groove 41a formed in the inner periphery of the mouth portion 46 and a region along the part from the seal land portion where the seal 26 slidably contact, via the inner race 28 to the small diameter stepped portion 45a. As the hardening process, induction hardening is preferably applied. The radially expanded plastic deformation portion 34 is a non-hardened portion and the material of the portion after forging has a surface hardness from 18 HRc to 24 HRc. The difference in the surface hardness between the plastic deformation portion 34 and the irregular portion 31 of the wheel hub 10 described above (from 54 HRc to 64 HRc) is preferably 30 HRc or more. In this way, the plastic deformation portion 34 can easily and deeply be engaged with the irregular portion 31, so that the end of the irregular portion 31 does not yield and they can be firmly plastically coupled with each other. Note that an end cap 48 is mounted at the inner diameter of the hollow outer joint member 41, and lubricant grease enclosed in the mouth portion 46 can be prevented from leaking out and dust can be prevented from coming inside.

Figure 11A:
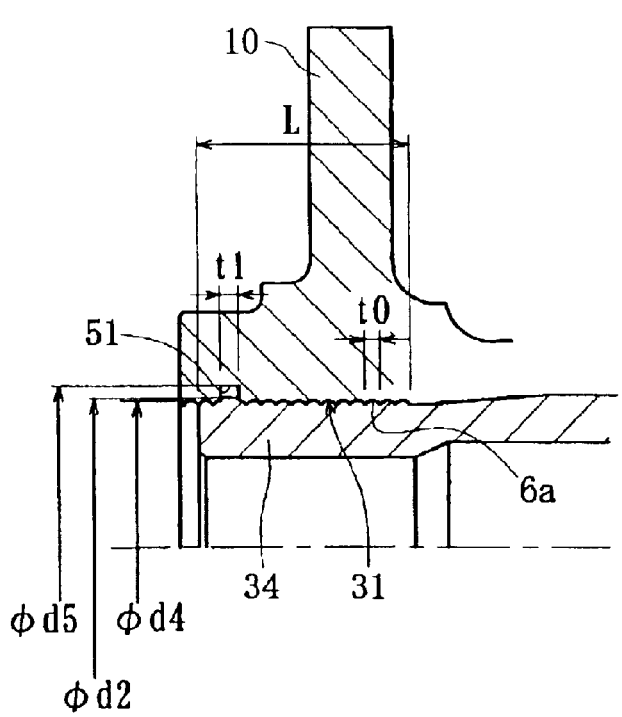

As described above, the irregular portion 31 is formed in the inner periphery of the wheel hub 10, and the irregular portion 31 covers about the area from a pilot portion 13 of the wheel hub 10 to the vicinity of the line of action of the rolling elements 22 on the outboard side (line extended from the line connecting the contact point between the rolling 22 and the inner race 27 and the center of the rolling element 22) through the wheel attachment flange 14. An annular recess 51 is formed on the outboard side of the irregular portion 31. More specifically, as shown in FIG. 11a, the annular recess 51 is formed at the outboard side end of the diameter expansion range L. The plastic deformation portion 34 at the axial portion 45 has its diameter expanded radially outward, so that the outer diameter portion of the plastic deformation portion 34 is firmly engaged with the irregular portion 31. Thus, the irregular portion 31 is partly removed to form the annular recess 51, so that the plastic deformation portion 34 is not restricted and has its diameter expanded more largely. Consequently, the pull-out resistance in the axial direction increases.

Figure 12:
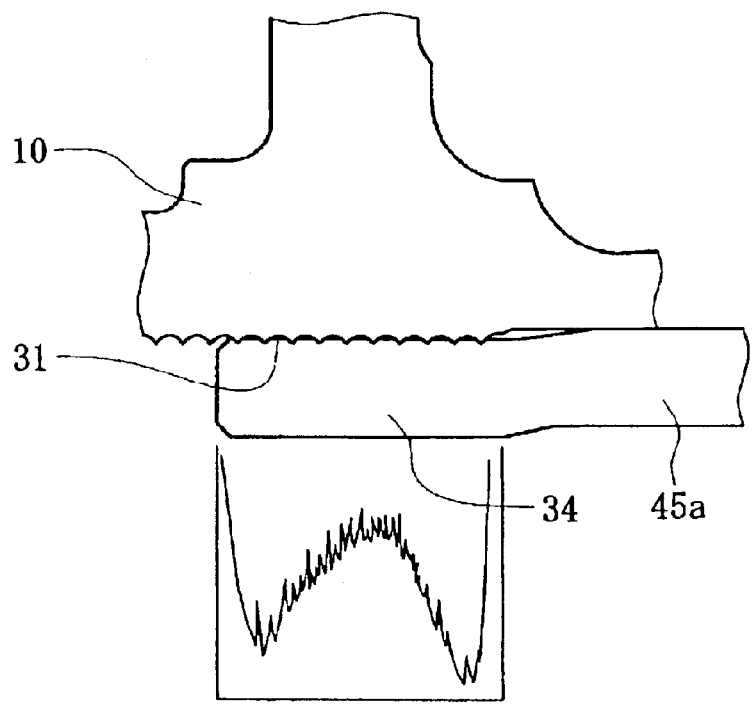
FIG. 12 is a view for use in illustration of a plastic coupling portion in a wheel bearing device according to the invention.
Figure 13A:
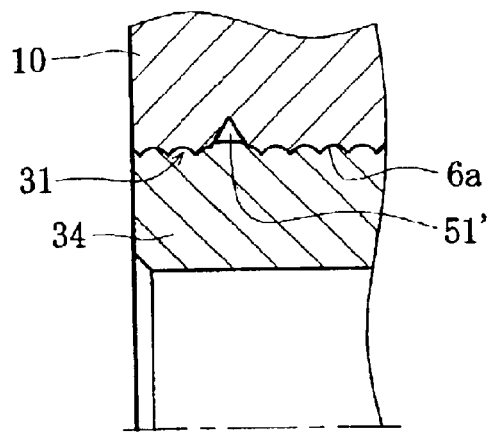
FIG. 13a is an enlarged view showing an essential part of an annular recess according to another embodiment.
Figure 13B:
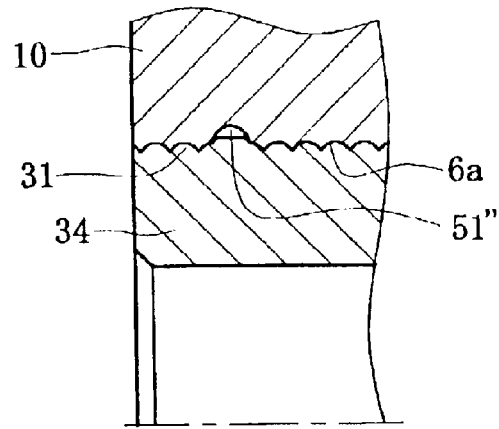
FIG. 13b is an enlarged view showing an essential part of an annular recess according to still another embodiment.

It has been found out through examinations in relation to diameter expansion carried out by the applicant that the center of the diameter expansion range L bites most deeply into the irregular portion 31. This can be estimated based on the shape of the inner diameter surface of the plastic deformation portion 34 as shown in FIG. 12. Consequently, the annular recess 51 formed in the center increases the pull-out resistance but reduces the amount of torque to be transmitted at the coupling portion, which is not preferable. The annular recess 51 that increases the pull-out resistance is equally formed in any axial location. According to the embodiment, the recess is formed in the end side of the diameter expansion range L that can minimize reduction in the torque transmission amount, in practice, the range from 0.5 to 3.0 times as large as the ridge pitch t0 of the annular groove 6a from the outboard end side of the diameter expansion range L. The annular recess 51 formed more on the outboard side causes the shearing strength on the side of the wheel hub 10 to be reduced, and desired pull-out resistance is not provided. Conversely, the annular recess 51 formed more on the inboard side causes the amount of torque to be transmitted at the coupling portion to be greatly reduced, which is not preferable.

In FIG. 11a, the width t1 of the annular recess 51 is in the range from 0.5 to 3.0 times as large as the ridge pitch t0 of the independent annular groove 6a. The bottom diameter d5 of the annular recess 51 is in the range from 1.01 to 1.20 times as large as the bottom diameter d4 of the annular groove 6a or the bottom diameter d3 of the axial groove 6b shown in FIG. 11b. In general, the bottom diameter d4 of the annular groove 6a and the bottom diameter d3 of the axial groove 6b is formed equally. When a difference exists in both bottom diameter d3 and d4, the large diameter is applied to the range.

Here, when the width t1 of the annular recess 51 is not more than 0.5 times as large as the ridge pitch t0 of the annular groove 6a, not only working is difficult but also the area of the shear plane at the extended portion filling the annular recess 51 is reduced, so that the pull-out resistance cannot be increased as expected. Meanwhile, when the width is not less than 3.0 times as large as the ridge pitch t0, the torque transmission amount at the coupling portion is greatly lowered, which necessitates the diameter expansion range L to be increased. Such increase in the diameter expansion range L can lead to increase in the weight of the device, which is not preferable.

The bottom diameter d5 of the annular recess 51 is 1.01 to 1.20 times as large as the bottom diameter d4 of the annular groove 6a or the bottom groove d3 of the axial groove 6b but the range depends on the material of the outerjoint member 41. For example, the guaranteed minimum value for the expansion of S53C is 15%, and therefore the value is preferably 1.20. Any value not less than 1.20 does not contribute to increase in the pull-out resistance but instead lowers the strength of the wheel hub 10, which is not preferable.

Figure 11B:
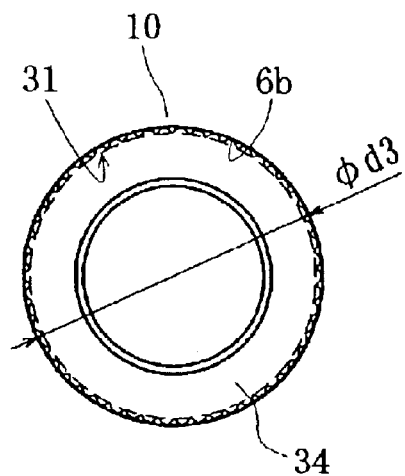

Now, the diameter expansion amount of the plastic deformation portion 34 will be described. As described above, a suitable tool such as a mandrel is inserted/pulled out to/from the inner diameter of the plastic deformation portion 34 in order to expand the diameter and make the portion 34 bite to the irregular portion 31 of the wheel hub 10. The values such as strength including the amount of torque to be transmitted or pull-out resistance at the coupling portion, the ductility of the material, the workability, the useful life of jigs and the like are taken into account to determine the diameter expansion amount. More specially, the inner diameter of the irregular portion 31 of the wheel hub 10, the inner diameter of the plastic deformation portion 34, and the outer diameter of the jig such as a mandrel used to expand the diameter are determined. According to the embodiment, as shown in FIGS. 11a and 11b, after the diameter expansion, the outer diameter d2 of the plastic deformation portion 34 in the annular recess 51 is 1.01 to 1.15 times as large as the bottom diameter d4 of the annular groove 6a or the bottom diameter d3 of the axial groove 6b. Note that the shape in cross section of the annular recess 51 is not only rectangular but may also be triangular like the annular recess 51' in FIG. 13A or semi-circular like the annular recess 51" in FIG. 13B.

Note that the bearing according to the embodiment is a so-called fourth generation wheel bearing in which the inner races 27, 28 of the double-row rolling bearing 20 are directly formed in the outer peripheral surface of the wheel hub 10 and the outer peripheral surface of the outer joint member 41. However, as long as the structure has the plastic coupling portion between the wheel hub and the outer joint member provided at the outboard side of the device, the invention is equally applicable to conventional second and third generation wheel bearing devices (FIGS. 6 and 5, respectively). More specifically, while the characteristics of the structures are unchanged, the coupling portion can be prevented from being loosened by repeated stress caused as the bending moment load is imposed on the device as the vehicle turns and the axial portion of the outerjoint member including the plastic coupling portion is bent. In addition, the amount of torque to be transmitted at the plastic coupling portion can be prevented from being reduced, and the pull-out resistance can be increased with a simple structure.

Figure 14A:
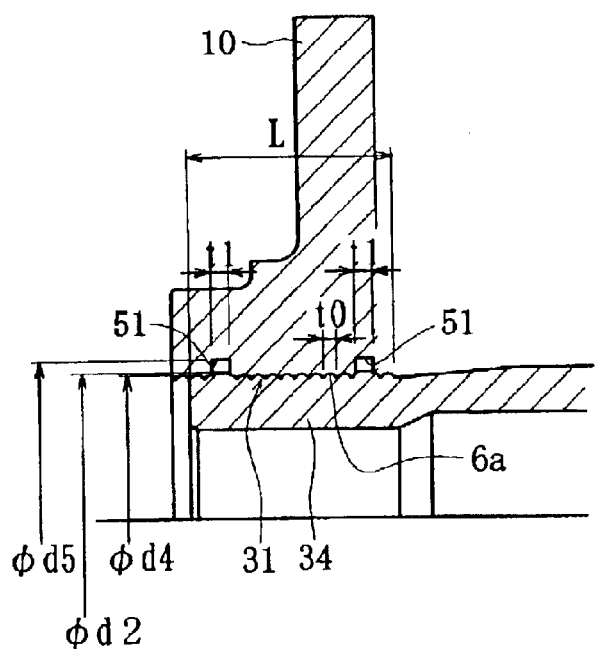
FIG. 14a is a cross-sectional view of an essential part of a wheel bearing device according to another embodiment of the invention.
Figure 14B:
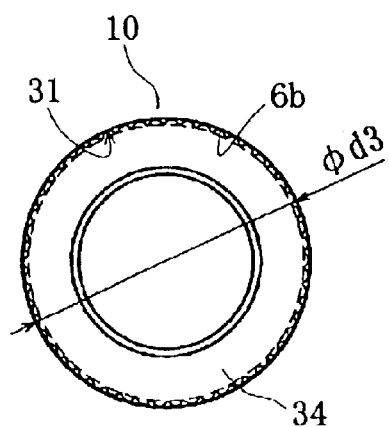

FIG. 14a is a cross-sectional view of an essential part of a wheel bearing device according to another embodiment of the invention, and FIG. 14b is a side view thereof. Here, an irregular portion 31 is formed in the inner periphery of a wheel hub 10, and an annular recess 51 is formed on the outboard side. This embodiment is substantially identical to the embodiment shown in FIG. 9 with the only difference being that another annular recess 51 is formed at the inboard side end of the diameter expansion range L in addition to the annular recess 51 shown in FIG. 11a. The same elements and portions are denoted by the same reference characters and will not be described. In this way, the annular recesses 51 are formed at both ends of the diameter expansion range L, so that the amount of torque to be transmitted at the coupling portion can be kept from being reduced, and the pull-out resistance can be even more increased. Note that the position, size, and the like of the annular recesses 51 are the same as those of the above embodiment.

Figure 15A:
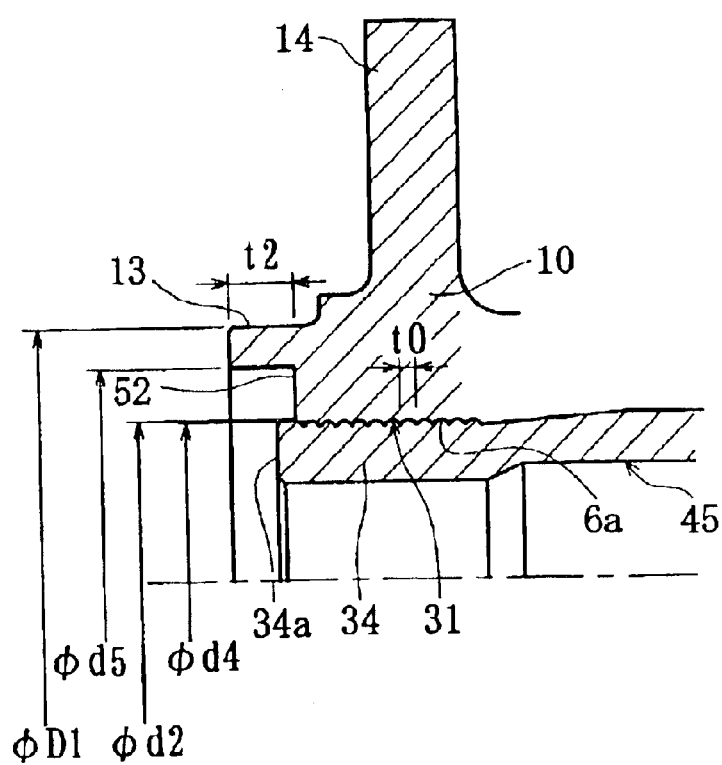
FIG. 15a is a cross-sectional view of a wheel bearing device according to another embodiment of the invention.
Figure 15B:
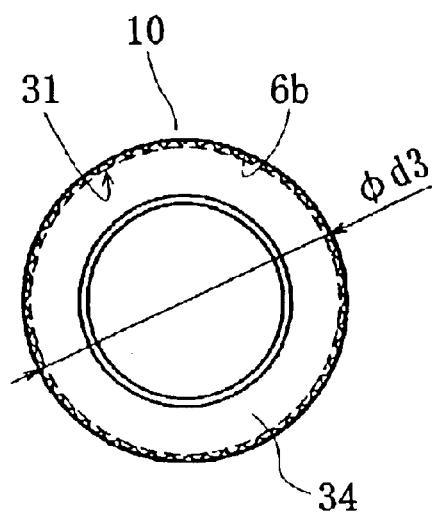

FIG. 15a is a cross-sectional view of an essential part of a wheel bearing device according to another embodiment of the invention, and FIG. 15b is a side view thereof. This embodiment is substantially identical to the previously described embodiments with the only difference being in the structure of the wheel hub. The same elements and portions are denoted by the same reference characters and will not be described.

The wheel hub 10 has a hardened irregular portion 31 in the inner periphery and allows the plastic deformation portion 34 of an axial portion 45 in an outer joint member 41 to be firmly engaged with the irregular portion 31 in order to plastically couple the wheel hub 10 and the outer joint member 41. Similarly to the embodiments described above, the range of the irregular portion 31 covers the area from a wheel pilot portion 13 via a wheel attachment flange 14 up to the vicinity of the line of action of the rolling element (not shown) on the outboard side. Here, the outboard side end face of the wheel hub 10 is counter sunk in order to form an annular recess 52. The plastic deformation portion 34 of the axial portion 45 has its diameter expanded radially outward, so that the outer diameter portion of the plastic deformation portion 34 bites into the irregular portion 31. The annular recess 52 produced by removing part of the irregular portion 31 allows the plastic deformation portion 34 at the part to be unrestricted and expanded more. Consequently, the expanded portion in the annular recess 52 increases the pull-out resistance in the axial direction.

In FIG. 15a, the depth of the annular recess 52, in other words, the size t2 of the plastic deformation portion 34 from the end face 34a is in the range from 0.5 to 3.0 times as large as the ridge pitch t0 of the independent annular groove 6a. The bottom diameter d5 of the annular recess 52 is not less than the bottom diameter d4 of the annular groove 6a or the bottom diameter d3 of the axial groove 6b shown in FIG. 15b and 1 mm smaller than the outer diameter D1 of the pilot portion 13 in the wheel hub 10 (D1−1 (mm)).

When the depth t2 of the annular recess 52 is not more than 0.5 times as large as the ridge pitch t0 of the annular groove 6a, the area of the shear plane of the portion extended into the annular recess 52 is reduced, and the pull-out resistance cannot be increased as intended. Meanwhile, when the depth is not less than 3.0 times as large as the ridge pitch t0, the amount of torque to be transmitted at the coupling portion is greatly reduced, which is not preferable.

The bottom diameter d5 of the annular recess 52 is not more than D1−1 (mm) in consideration of the strength and workability of the pilot portion 13. Therefore, similarly to the annular recess 51 according to the previously described embodiments, the diameter may be in the range from 1.01 to 1.20 times as large as the bottom diameter d4 of the annular groove 6a or the bottom diameter d3 of the axial groove 6b.

Similarly to the previously described embodiments, as for the diameter expansion amount of the plastic deformation portion 34, values such as strength including the amount of torque to be transmitted or pull-out resistance at the coupling portion, the ductility of the material, the workability, the useful life of jigs are taken into account to determine the inner diameter of the irregular portion 31 of the wheel hub 10, the inner diameter of the plastic deformation portion 34, and the outer diameter of the diameter expansion jig such as a mandrel. More specifically, the outer diameter d2 of the plastic deformation portion 34 in the annular recess 52 after the diameter expansion is in the range from 1.01 to 1.15 times as large as the bottom diameter d4 of the annular groove 6a or the bottom diameter d3 of the axial groove 6b.

Figure 16:
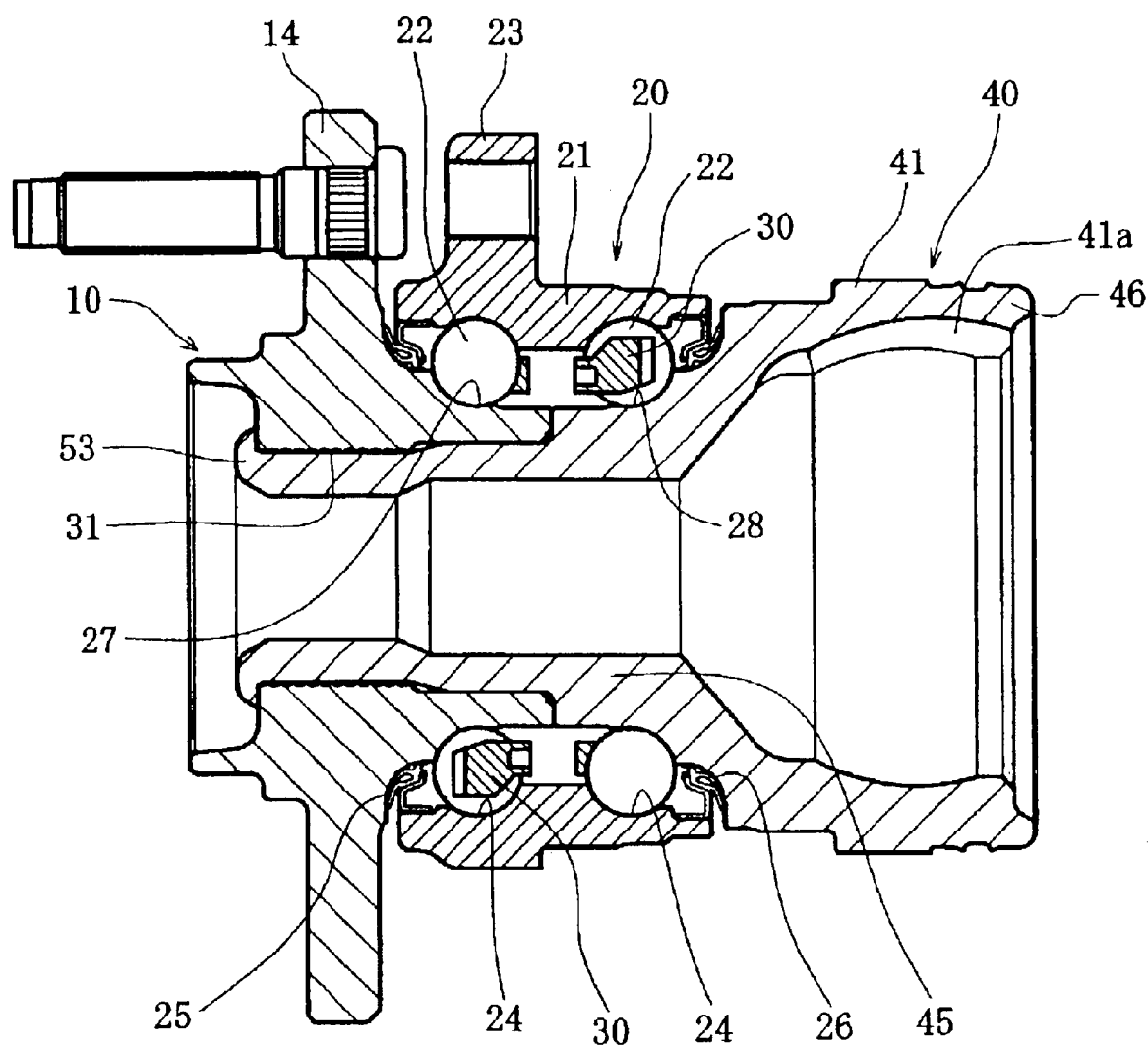
FIG. 16 is a cross-sectional view of an essential part of a wheel bearing device according to another embodiment of the invention.

FIG. 16 shows a wheel bearing device according to another embodiment of the invention. The wheel bearing device is different from the wheel bearing device shown in FIG. 9 in that the end of the outer joint member 41 is plastically deformed radially outwardly to form a swaged portion 53 that axially fixes the wheel hub 10 and the outer joint member 41. In the wheel bearing device, the annular recesses 51 and 52 as described above can be formed.

As in the foregoing, in the wheel bearing device according to the invention, an irregular portion is partly removed to form a prescribed annular recess, so that a part of the member that is located inside is partly extended in the annular recess. In this way, the plastic deformation portion at the part is unrestricted by the irregular portion and expanded more. Consequently, the pull-out resistance between the wheel hub and the outer joint member can be increased with a simple structure.

Although the present invention has been described and illustrated in detail, it is clearly understood that the same is by way of illustration and example only and is not to be taken by way of limitation. It should be understood that the invention may be embodied in various other forms without departing from the gist of the invention. The scope of the invention is indicated by the appended claims and all changes which come within the meaning and range of equivalency of the claims are therefore intended to be embraced therein.

What is claimed is:

1. A wheel bearing device, comprising:
   an outer member formed with double-row outer races on an inner periphery thereof;
   an inner member including a wheel hub having a flange for attachment of a wheel and an fitting member fitted to one of an inner-periphery or an outer periphery of the wheel hub, said inner member being formed with double-row inner races on an outer periphery thereof, the member that is located outside out of the wheel hub and the fitting member being provided with a hardened irregular portion, the other member that is located inside out of the wheel hub and the fitting member being expanded radially outward by plastic deformation to be engaged with the irregular portion, so that the wheel hub and the fitting member are coupled with each other; and
   double-row rolling elements interposed between the outer races and the inner races, wherein
   a ratio of an inner diameter $\Phi dA$ before plastic deformation at a plastic deformation portion of the member that is located inside and an inner diameter $\Phi dB$ after the plastic deformation ($\Delta = \Phi dB / \Phi dA$) is equal to 1.05 or more.

2. A wheel bearing device according to claim 1, wherein an upper limit value for the ratio $\Delta$ is determined based on a material of the member that is located inside.

3. A wheel bearing device according to claim 2, wherein the member that is located inside is made of S40C, and the ratio $\Delta$ is equal, to or less than, 1.20.

4. A wheel bearing device according to claim 2, wherein the member that is located inside is made of S53C, and the ratio $\Delta$ is equal to, or less than, 1.15.

5. A wheel bearing device, comprising:
   an outer member formed with double-row outer races on an inner periphery thereof;
   an inner member including a wheel hub having a flange for attachment of a wheel and an fitting member fitted to one of an inner periphery or an outer periphery of the wheel hub, said inner member being formed with double-row inner races on an outer periphery thereof, the member that is located outside out of the wheel hub and the fitting member being provided with a hardened irregular portion, the other member that is located inside out of the wheel hub and the fitting member being expanded radially outward by plastic deformation to be engaged with the irregular portion, so that the wheel hub and the fitting member are coupled with each other; and
   double-row rolling elements interposed between the outer races and the inner races, wherein
   the irregular portion is partly removed to form an annular recess, and a part of the member that is located inside is extended in the annular recess.

6. A wheel bearing device according to claim 5, wherein the annular recess is formed at at least one end of said irregular portion excluding the central part of a range for diameter expansion.

7. A wheel bearing device, comprising:
   an outer member formed with double-row outer races on an inner periphery thereof;
   an inner member including a wheel hub having a flange for attachment of a wheel and an fitting member fitted to one of an inner periphery or an outer periphery of the wheel hub, said inner member being formed with double-row inner races on an outer periphery thereof, the member that is located outside out of the wheel hub and the fitting member being provided with a hardened irregular portion, the other member that is located inside out of the wheel hub and the fitting member being expanded radially outward by plastic deformation to be engaged with the irregular portion, so that the wheel hub and the fitting member are coupled with each other; and
   double-row rolling elements interposed between the outer races and the inner races, wherein
   an end face of the irregular portion is partly removed to form an annular recess, and a part of the member that is located inside is extended in the annular recess.

8. A wheel bearing device according to claim 5 or 7, wherein
   the irregular portion includes a crossing groove pattern having a plurality of annular grooves and a plurality of axial grooves substantially intersecting one another.

9. A wheel bearing device according to claim 8, wherein the annular recess is formed to be in the range from 0.5 to 3.0 times as large as a ridge pitch of the annular groove from one end side of the range for diameter expansion.

10. A wheel bearing device according to claim 8, wherein an axial size of the annular recess is in the range from 0.5 to 3.0 times as large as a ridge pitch of the annular groove.

11. A wheel bearing device according to claim 8, wherein a bottom diameter of the annular recess is in the range from 1.01 to 1.20 times as large as a bottom diameter of the annular groove or the axial groove.

12. A wheel bearing device according to claim 8, wherein an outer diameter after expanding the diameter of the plastic deformation portion is set in the range from 1.01 to 1.15 times as large as a bottom diameter of the annular groove or the axial groove.

13. A wheel bearing device according to any one of claims 1, 5, and 7, wherein
the fitting member is an outer joint member of a constant velocity joint, and the double-row inner race is provided at the outer periphery of each of the wheel hub and the outer joint member.

14. A wheel bearing device according to any one of claims 1, 5, and 7, wherein
the fitting member is an inner ring fitted to the outer periphery of the wheel hub.

15. A wheel bearing device according to claim 14, wherein
the double-row inner race is formed at the outer periphery of each of the wheel hub and the inner ring.

16. A wheel bearing device according to claim 14, wherein
the double-row inner race is formed at the outer periphery of each of the two inner rings fitted to the outer periphery of the wheel hub.

17. A wheel bearing device according to any one of claims 1, 5, and 7, wherein
a load carrying capacity of a bearing including a rolling element on an inboard side of the double-row rolling elements is set to be higher than that on an outboard side.

* * * * *